United States Patent [19]
Plante

[11] Patent Number: 5,070,805
[45] Date of Patent: Dec. 10, 1991

[54] CAMMING CLEAT MEMBER FOR ROPE

[76] Inventor: Wilfred M. Plante, 733 E. Third St., St. Paul, Minn. 55106

[21] Appl. No.: 528,845

[22] Filed: May 25, 1990

[51] Int. Cl.$^5$ .............................................. B63B 21/04
[52] U.S. Cl. .................................. 114/218; 24/134 P; 114/199
[58] Field of Search ............ 114/199, 218; 24/132 R, 24/134 R, 134 P, 134 L, 134 N, 134 KB, 134 KA; 188/65.1–65.5; 182/5–7

[56]       References Cited
       U.S. PATENT DOCUMENTS

| | | | |
|---|---|---|---|
| 349,031 | 9/1886 | Cook | 24/134 |
| 413,882 | 10/1889 | Amet | 24/134 |
| 626,230 | 6/1899 | Hawes | 24/134 |
| 1,243,105 | 6/1917 | Richardson | 24/134 |
| 1,962,964 | 6/1934 | Morrison | 24/134 P |
| 2,226,393 | 12/1940 | Seeger et al. | 24/134 R |
| 2,292,746 | 4/1942 | Donald | 24/134 |
| 2,836,870 | 6/1958 | Shea | 24/134 |
| 3,034,187 | 5/1962 | Hebard | 24/134 |
| 3,644,966 | 2/1972 | Higgins | 24/134 P |
| 4,092,941 | 3/1977 | Gryglas | 114/218 |
| 4,140,207 | 2/1979 | Sharp et al. | 24/134 |
| 4,553,495 | 11/1985 | Lerner | 114/218 |
| 4,660,493 | 4/1987 | Lowry, III | 114/199 |
| 4,766,835 | 8/1988 | Randall et al. | 114/218 |
| 4,899,423 | 2/1990 | Randall | 24/134 R |

Primary Examiner—Ed Swinehart
Attorney, Agent, or Firm—Haugen and Nikolai

[57]           ABSTRACT

A camming cleat for securing a length of line or rope to a boat or other such object, with the camming cleat being designed to simultaneously retain and hold one or a pair of lines in cleated relationship. The device includes a generally conically arranged base plate with a pair of rope receiving slots formed chordally therewithin and having a spring-biased camming plate disposed and received coaxially within the base plate and arranged for rotation relative to the plate. The camming plate is provided with a pair of generally "U" shaped channels each with a profiled depth which decreases as the camming radius increases, and furthermore may be provided with retainer prongs which are curved arcuately in a direction so as to be more generally normal to the axis of the cleated rope.

7 Claims, 3 Drawing Sheets

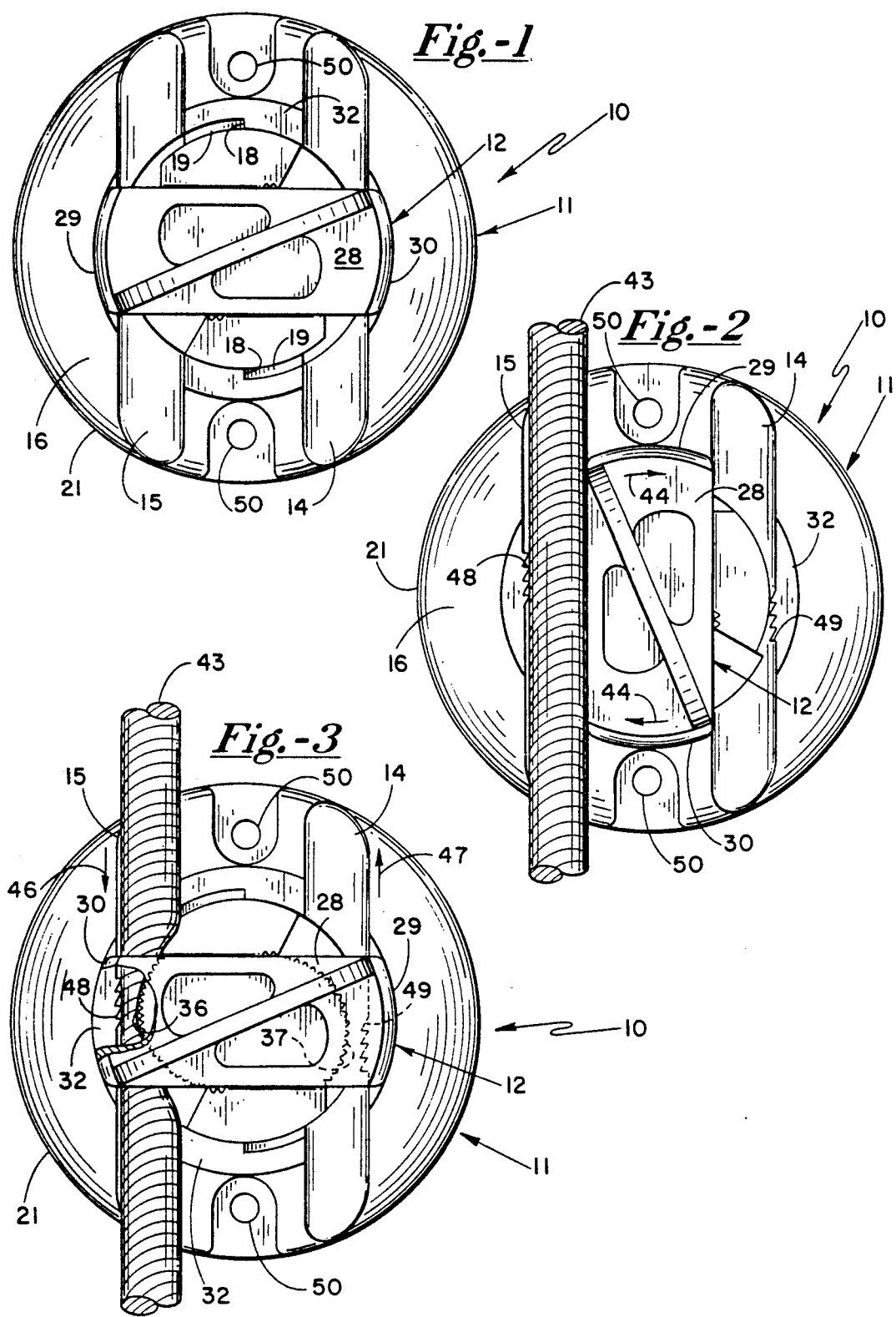

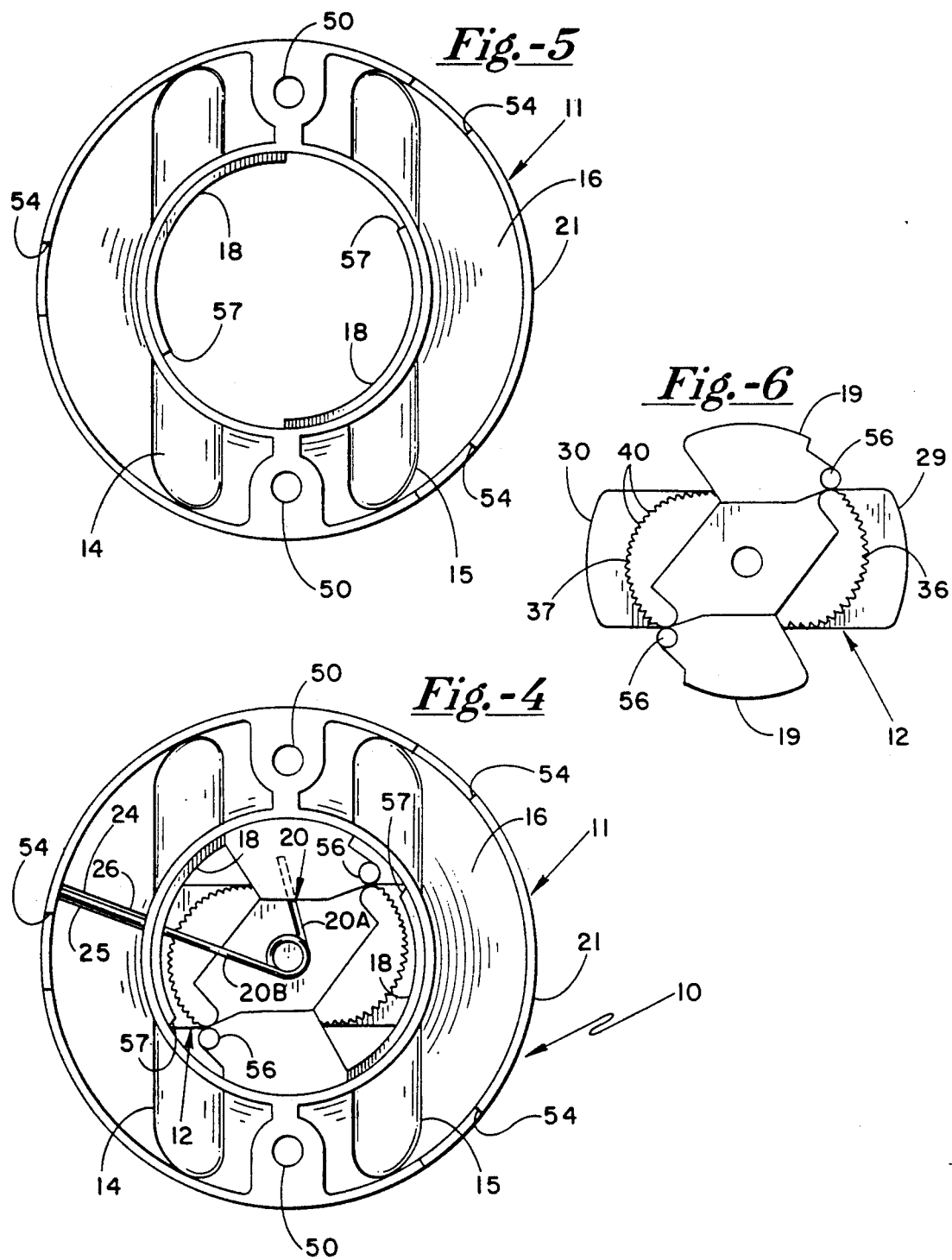

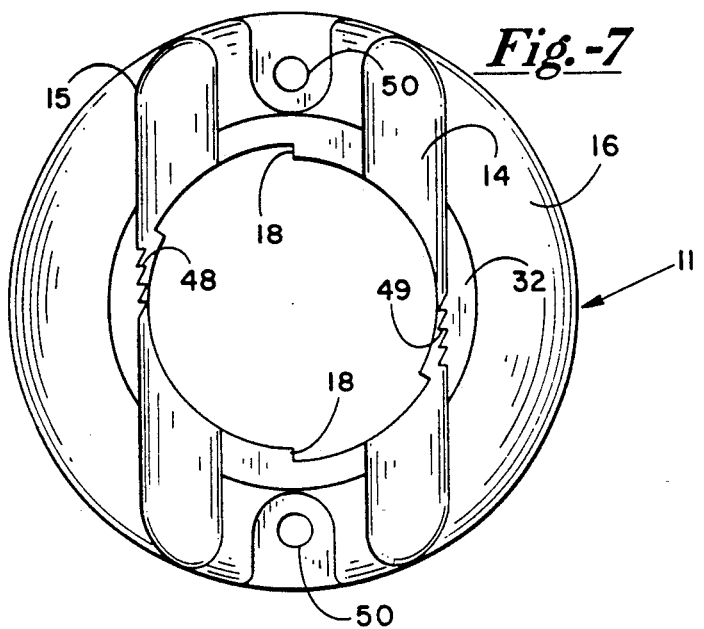
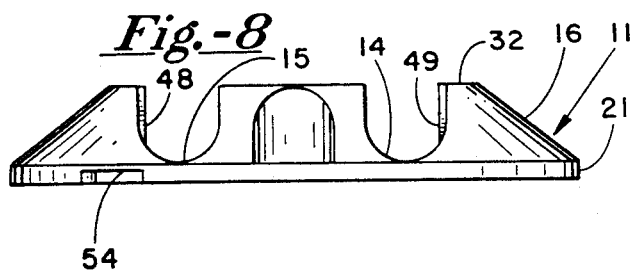
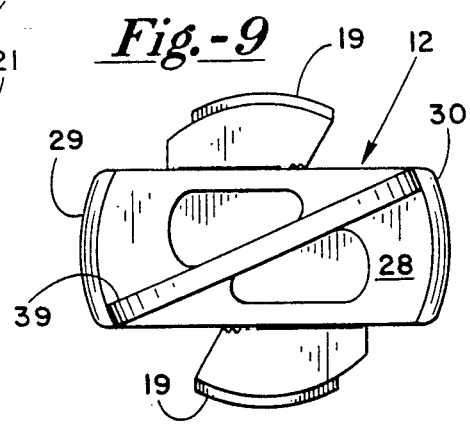
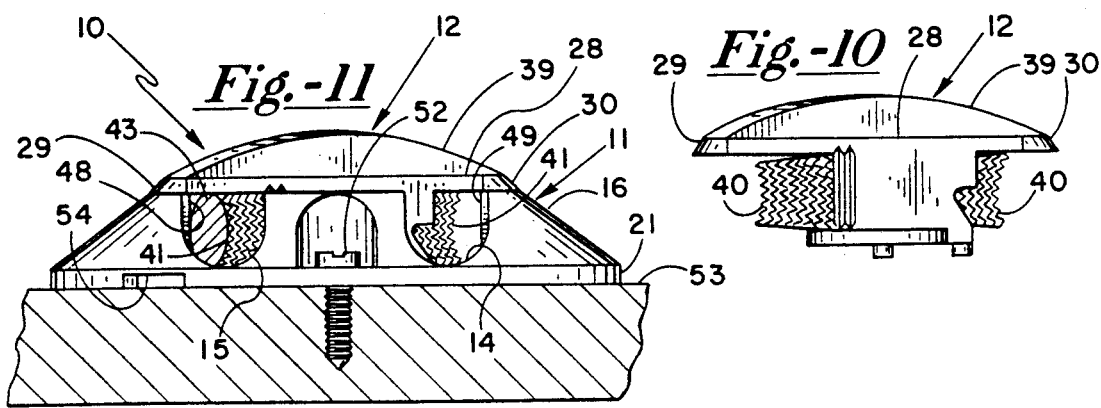

CAMMING CLEAT MEMBER FOR ROPE

BACKGROUND OF THE INVENTION

The present invention relates generally to a camming cleat or snubber device for securing or locking in place a length of line or rope to secure a boat or other such object to a dock or the like. Camming cleats are widely utilized in connection with sailboats and other water craft, and are normally mounted in place to be used for securing sheets or sails in a desired disposition, or alternatively may be used for mooring operations and the like.

In the past, camming cleats have been known and generally widely utilized for these purposes. Examples of such camming cleats are found in U.S. Pat. Nos. 4,553,495, 1,243,105 and in U.S. Pat. No. 2,226,393. Other examples of camming cleats are available as well.

SUMMARY OF THE INVENTION

One of the problems common to camming cleats available in the past include the difficulty in releasing and/or repositioning the rope or line from its locked or secured position. Another difficulty commonly found in these devices is the inability of a number of such devices to handle more than one line or more than one line size simultaneously. A still further problem has existed in the tendency of the locked, secured or snubbed line to slide or slip from its locked position relative to the cleat, with such problems being common whenever a slightly undersized line is being used. The design of the camming cleat of the present invention is such that a single cleating device is useful for a large range of line diameters.

The design of the camming cleat of the present invention has a still further advantage in that it may be fabricated from either cast metal, or plastic. Whenever heavier duty or heavier strengths are required, metal is clearly the material of choice, although certain types of plastic material have been found to be quite durable and acceptable for certain structures for at least moderate duty.

In accordance with the present invention, a camming cleat or snubber device for rope is provided which is designed to simultaneously cleat and/or snub one or a pair of lines, with the snubbing activity of the device being such that the line or lines are securely locked in place, and are not readily subject to slippage in the wrong direction from the locked position. The device of the present invention has a further advantage in that it is useful for simultaneous cleating of lines of modestly different diameters, with the design permitting simultaneous use with lines of different diameters, without suffering or risking slippage.

In accordance with the present invention, a camming cleat and snubber for rope is provided which comprises a generally conically arranged base plate with up to a pair of rope receiving slots being formed chordally therewithin, and having a spring-biased camming plate disposed and received coaxially within the base plate. The camming plate is arranged for rotation relative to the base plate, in order to permit ropes and/or lines to be received for locking engagement therewithin. It is another feature of the present invention to provide a profiled or tailored slot in the camming plate so that the rope or line remains centered within the camming plate while in its captive or locked position. Furthermore, arcuately raked teeth are provided in the profiled area so as to further grip the teeth and secure the rope or line in its locked or captive position. The utilization of teeth arranged or raked at an angle permits the rope or line to freely slide in the non-captive or free-movement direction, while securely gripping and holding the line or rope whenever it moves in or toward the locked direction.

The base plate includes a lower surface functioning as a pad surface, with the rope receiving slots being arranged across and along the upper surface of the base plate. The rope receiving slots or grooves are arranged in generally oppositely disposed relationship to the central axis of the base plate, with the base plate further having a camming plate receiving bore arranged coaxially therewithin, and extending inwardly from the upper surface thereof. The camming plate has an upper rectangular plate formed therein, with arcuately shaped ends for rotation within the base plate bore. A pair of profiled and toothed rope receiving slots are formed within the camming plate, with the major axis of the rectangular plate having a length generally equal to the diameter of the plate receiving bore. The minor axis of the rectangular plate has a length substantially less than the diameter of the camming plate receiving bore so as to permit ingress of a length of rope or line laterally thereof and into the rope receiving slots when the camming plate is rotatably positioned within the base plate. The axes of the rope receiving slots are generally parallel to the major axis of the camming plate. In addition, the camming plate is provided with a pair of generally oppositely disposed profiled and toothed rope camming surfaces which are arranged to capture or snub a rope within the rope receiving slots and against the radially outer surfaces thereof. The rope camming surfaces have a profile depth which decreases as the camming radius increases and the teeth are raked along their axes relative to the surface of the cam so as to permit the rope or line to freely slide in one direction, while being gripped by the teeth when relative motion occurs in the camming or gripping direction. The arrangement of the present invention provides further advantages in the ability of the device to handle ropes or lines of modestly differing diameters, and furthermore provides a means for securely locking and/or retaining the ropes or lines within the locking device.

Therefore, it is a primary object of the present invention to provide an improved camming cleat and snubber for ropes designed to securely lock up to two lines simultaneously therewithin, and with the camming cleat device of present invention being particularly designed to securely receive, lock, and retain lines therewithin.

It is yet a further object of the present invention to provide an improved camming cleat and snubber for rope which utilizes a spring-biased camming plate disposed coaxially within a conically arranged base plate, and wherein the camming plate is provided with a pair of rope camming surfaces arranged to snub and/or capture a rope within slots formed within said base plate, and wherein the rope camming surfaces have a profiled generally "U" shaped depth or root which decreases as the camming radius increases.

Other and further objects of the present invention will become apparent to those skilled in the art upon a study of the following specification, appended claims and accompanying drawings.

BRIEF DESCRIPTION OF THE DRAWINGS

FIG. 1 is a top plan view of the camming cleat and snubber device of the present invention, and illustrating the camming plate in its normal or relaxed disposition, and being illustrated without a line or rope secured therewithin;

FIG. 2 is a view similar to FIG. 1, and illustrating the disposition of the device when a rope has been inserted therewithin, but prior to its being locked in place;

FIG. 3 is a view similar to FIG. 2, and illustrating the disposition of the proponents when a rope or line is locked and retained in position therewithin;

FIG. 4 is a bottom plan view of the device of FIG. 3, and illustrating the disposition of the spring-biasing member secured between the base plate and the camming plate;

FIG. 5 is a bottom plan view of the base plate portion only of the device illustrated in FIGS. 1-4 inclusive;

FIG. 6 is a detail bottom plan view of the camming plate component of the device;

FIG. 7 is a top plan view of the base plate component, and illustrating the detail of the device in the manner in which the camming plate is lockingly received therewithin;

FIG. 8 is an elevational view of the base plate component;

FIG. 9 is a top plan view of the camming plate component;

FIG. 10 is a side elevational view of the camming plate component; and illustrating the manner in which individual ropeengaging teeth are provided therewithin; and FIG. 11 is a side elevational view of the camming cleat and snubber of the present invention, and illustrated in a surface mounted disposition upon the surface of a boat or mooring dock.

DESCRIPTION OF THE PREFERRED EMBODIMENT

With attention being directed to FIGS. 1-3 of the drawings, the rope cleat and snubber means of the present invention, generally designated 10 comprises a base plate component 11 and a camming plate 12. The base plate 11 is in the form of a generally conically arranged device with a pair of rope receiving slots 14 and 15 chordally arranged or formed therewithin, and being arranged along the upper surface 16 of base plate 11. Camming plate 12 is disposed and received coaxially within base plate 11, and is arranged for rotation relative to the base plate. A pair of locking lugs are formed within base plate 11, as shown in detail in FIG. 5, for example, at 18-18. Corresponding recesses are formed on camming plate 12 in order to permit the camming plate to be dropped and lockingly engaged into base plate 11. Such mating surfaces are shown in FIG. 6 as at 19-19.

Camming plate 11 is mechanically biased by means of spring 20 (FIG. 4), thus providing a normal disposition for camming plate 11 within base 12 as illustrated in FIG. 1.

The base plate further includes a pad surface on the lower surface thereof, as is illustrated at 21 in FIGS. 4 and 5. The spring member 20 has a pair of legs such as 20A and 20B, with leg 20A being received in blind bore 23, and with leg 20B being received within groove or slot 24 disposed between a pair of outwardly extending abutments 25 and 26 which are rolled inwardly to capture and retain leg 20B.

Camming plate 12 is provided with an upper rectangular plate 28 which has generally arcuately shaped ends 29 and 30 thereon. Arcuately shaped ends 29 and 30 overhang, to a limited extent, cam plate support surface 32 (see FIGS. 9 and 11 for clarity). Generally rectangular plate 28 of camming plate 12 has a long axis with an axial dimension (see FIG. 6 for clarity). Additionally, camming plate 12 includes a pair of cammed rope retaining surfaces 35 and 36 each having an increasing radius, also illustrated in FIG. 6. As indicated in FIG. 6, the dimension of the minor axis of camming plate 12 is less than the major axis, as illustrated by dimension 37 in FIG. 6. This arrangement permits the ingress of a length of rope into the rope receiving slots when the camming plate is rotatably positioned within the base plate, particularly in the disposition illustrated in FIG. 2. In order to permit gripping and turning motion with the fingers, camming plate 12 is provided with a diametrically arranged rib as at 39, best illustrated in FIG. 11. With attention now being directed to FIGS. 10 and 11 of the drawings, it will be noted that the camming plate 12 has a generally "U" shaped slot formed therein, with generally conically shaped teeth or projections being provided as at and the depth of such slot decreases as the camming radius increases 40. The arcuate recesses formed within the camming plate are illustrated in both FIGS. 10 and 11, particularly at 41. It will be observed in FIG. 6 that the individual teeth as at 40-40 have arcuately formed or raked tips so as to arrange for further resistance to relative motion between rope or line while locked in the camming plate device while at the same time permitting relative motion to occur in the non-locking or freemoving direction. In other words, the teeth are arranged with an axis at the tip extending at an acute angle to meet the base surface of the camming plate surfaces to achieve this gripping/sliding feature.

With attention being redirected to FIGS. 1-3 of the drawings, the rope camming cleat device of the present invention is illustrated in FIG. 1 with the spring member 20 biasing camming plate 12 into the disposition illustrated. In this arrangement, camming plate extensions or dogs 19-19 underlie the surface of abutment or locking flanges 18-18. In order to insert a rope to be retained therewithin, camming plate 12 is rotated relative to base plate 11 in a counterclockwise direction (FIG. 1), until the position illustrated in FIG. 2 is reached. At this point, chordally arranged grooves 14 and 15 are opened, and rope 43 may be introduced therewithin. Upon relaxing or removing finger pressure from camming plate 12, spring 20 biases camming plate along the direction of arrows 44-44, in order to lockingly engage rope 43 within the device. The configuration and disposition of rope 43 within the camming plate is illustrated in detail in the cut-away portions of FIG. 3.

As is apparent from the views of FIGS. 1-3, a pair of lines may be simultaneously inserted into the snubber 10, with the rope in the position of rope 43 resisting motion or forces applied in the direction of arrow 46, and with ropes or lines when held in slot 14 resisting motion or forces when applied in the direction of arrow 47.

In order to provide additional forces against relative motion of the cleated rope, individual teeth are provided in and along the outer surface of grooves 14 and 15, as shown at 48 and 49. Such teeth or uneven surfaces assist in developing additional friction between the camming cleat and the ropes retained therewithin.

In order to appropriately mount the assembly onto a base or the like, bores are formed in base plate as at 50 and 51, in order to receive screws or similar anchors as at 52, for mounting upon the surface 53.

In order to assist in reduction of corrosive forces, it will be noted that base plate 11 is provided with stand-off surfaces so as to form drain ports, such as illustrated at 54 (FIGS. 8 and 11).

While various techniques may be employed to limit the extent of motion of the camming plate 12 within base plate 11, a pair of abutment posts are provided on the underside of camming plate 12 as at 56-56, with posts 56 being arranged to make contact with end surfaces 57-57 of flanges 18-18.

It will be appreciated that various modifications may be made of the device illustrated herein without departing from the spirit and scope of the present invention.

What is claimed is:

1. Rope cleat and snubber means for simultaneous snubbing of up to a pair of ropes and comprising a generally conical base plate with a pair of rope receiving slots formed chordally therewithin and having a spring-biased camming plate disposed and received coaxially within said base plate and arranged for rotation relative thereto, said rope cleat and snubber means being characterized in that:
    (a) said base plate includes a pad surface along an undersurface thereof and with said pair of rope receiving slots arranged generally chordally along an upper surface of said base plate and in generally oppositely disposed relationship to a central axis of said base plate, said base plate further having a camming plate receiving bore extending inwardly from the upper surface thereof;
    (b) said camming plate having an upper generally rectangular plate with arcuately shaped ends adapted for rotation within said base plate bore, and with a major axis of said rectangular plate having a length which exceeds a diameter of said camming plate receiving bore, and with a minor axis having a length substantially less than the diameter of said camming plate receiving bore so as to permit ingress of a length of a rope into said pair of rope receiving slots when said camming plate is rotatably positioned within said base plate with said rope receiving slots generally parallel to said major axis; and
    (c) said camming plate having a pair of generally oppositely disposed rope camming surfaces having an increasing radius, and arranged to snub a rope captured within said rope receiving slots and to force said captured rope against an outer surface of said rope receiving slots, said rope camming surfaces having a generally "U" shaped channel with a profiled depth which decreases as the camming radius increases.

2. The rope cleat and snubber means as defined in claim 1 being particularly characterized in that the rope camming surfaces of said camming plate include a plurality of generally conically shaped teeth arranged to grip a rope surface held therewithin, and wherein the axes of said conically shaped teeth are raked so as to meet said rope camming surfaces at an angle which is acute relative to the increasing camming radius of said camming surfaces.

3. Rope cleat and snubber means for snubbing of ropes and lines comprising a generally conical base plate having at least one rope receiving slot formed chordally therewithin and having a spring-biased camming plate disposed and received coaxially within said base plate and arranged for rotation relative thereto, said rope cleat and snubber means being characterized in that:
    (a) said base plate includes a pad surface along an undersurface thereof and with at least one rope receiving slot arranged generally chordally along an upper surface of said base plate, said base plate further having a camming plate receiving bore extending inwardly from the upper surface thereof;
    (b) said camming plate having an upper plate adapted for rotation within said base plate bore, and with at least one dimension of said plate having a length which exceeds the diameter of said camming plate receiving bore, and having means for permitting ingress of a length of line or rope into said rope receiving slot when said camming plate is rotatably positioned within said base plate with the axis of said rope receiving slot being generally parallel to said ingress permitting means;
    (c) said camming plate having at least one rope camming surface having an increasing radius and arranged to snub a rope captured within said rope receiving slot and to force said captured rope against an outer surface of said rope receiving slot, said rope camming surface having a generally "U" shaped channel with a profiled depth which decreases as the camming radius increases; and
    (d) said rope camming surface of said camming plate includes a plurality of generally conically shaped teeth arranged to grip a rope surface held therewithin, and wherein the axes of said conically shaped teeth are raked so as to meet said rope camming surface at an angle which is acute relative to the increasing camming radius of said camming surface.

4. The rope cleat and snubber means as defined in claim 3 being particularly characterized in that the length of said camming plate provides a portion arranged in overhanging relationship to said rope receiving slot when a rope is being retained within said rope receiving slot so as to capture and retained rope within said rope receiving slot.

5. Rope cleat and snubber means for snubbing ropes comprising a base plate having a spring-biased camming plate disposed and received generally coaxially within said base plate and arranged for rotation relative thereto, said rope cleat and snubber means being characterized in that:
    (a) said base plate includes a pad surface along an undersurface thereof and at least one rope receiving slot arranged generally chordally along an upper surface of said base plate, said base plate further having a camming plate receiving bore extending inwardly from the upper surface thereof;
    (b) said camming plate having means for permitting ingress of a length of rope into said rope receiving slot when said camming plate is rotatably positioned within said base plate with an axis of said rope receiving slot generally parallel to said ingress permitting means;
    (c) said camming plate having at least one rope camming surface having an increasing radius and arranged to snub a rope captured within said rope receiving slot and to force said captured rope against an outer surface of said rope receiving slot, said rope camming surface having a generally "U" shaped channel with a profiled depth which decreases as the camming radius increases; and (d) said rope camming surface of said camming plate includes a first plurality of teeth arranged to grip a rope surface disposed in said rope receiving slot.

6. The rope cleat and rubber means as defined in claim 5 wherein the teeth are raked so as to meet said rope camming surface at an acute angle relative to the radius of said camming surface.

7. The rope cleat and snubber means as defined in claim 6 wherein said outer surface of said rope receiving slot comprises a second plurality of teeth disposed generally opposite said first plurality of teeth.

* * * * *

UNITED STATES PATENT AND TRADEMARK OFFICE
CERTIFICATE OF CORRECTION

PATENT NO. : 5,070,805

DATED : December 10, 1991

INVENTOR(S) : Wilfred M. Plante

It is certified that error appears in the above-identified patent and that said Letters Patent is hereby corrected as shown below:

Column 6, line 46, "and" should read -- said --.

Column 8, line 1, "rubber" should read -- snubber --.

Signed and Sealed this

Twenty-third Day of March, 1993

*Attest:*

STEPHEN G. KUNIN

*Attesting Officer*  Acting Commissioner of Patents and Trademarks